W. E. Budd,
Churn.
No. 113,251.  Patented Apr. 4, 1871.

Witnesses.
Fred. Haynes
R. I. Aulwein

Wm. E. Budd.

United States Patent Office.

WILLIAM E. BUDD, OF CHATHAM, NEW JERSEY.

Letters Patent No. 113,251, dated April 4, 1871.

IMPROVEMENT IN CHURNS.

The Schedule referred to in these Letters Patent and making part of the same.

*To all whom it may concern:*

Be it known that I, WILLIAM E. BUDD, of Chatham, in the county of Morris and State of New Jersey, have invented a new and useful Improvement in Churns; and I do hereby declare that the following is a full, clear, and exact description thereof, reference being had to the accompanying drawing forming a part of this specification.

This invention consists in the combination of a rotary dasher, having a series of perforated blades, with a series of spirally-arranged fixed blades or abutments in the barrel of the churn, whereby a more perfect agitation of the contained milk is effected throughout the churn.

In the drawing—

Similar letters of reference represent corresponding parts in both figures.

Figure 2:
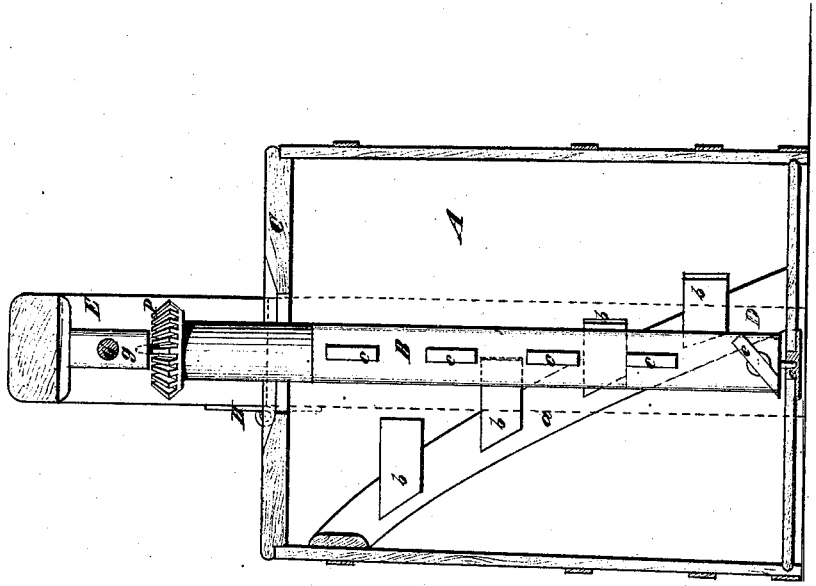
Figure 2 is a sectional elevation taken at right angles to the said fig. 1.
Figure 1:
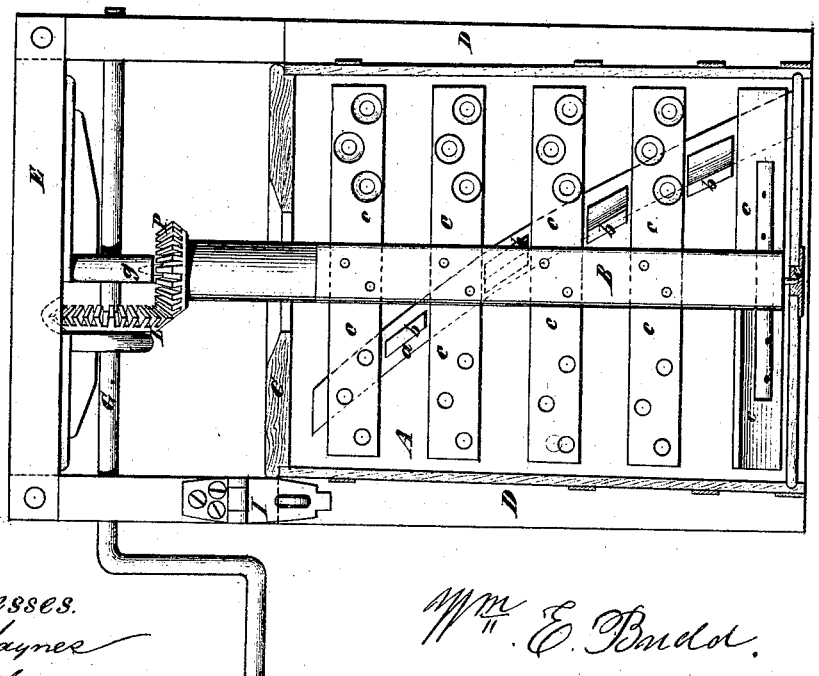
Figure 1 is a front elevation of my churn, showing the barrel in section.

A is the barrel of the churn, in the interior of which is a rib, $a$, that extends spirally around a portion of the barrel, and has projecting from it at regular intervals a series of blades or abutments, $b\ b$.

The barrel is fitted in the ordinary manner with a cover, C, and provided in the center of its bottom with a metal plate, $e$, which forms the lower bearing of the dasher B.

Said barrel has secured on its exterior, at opposite sides, two posts, D D, to the upper end of which the standard E is hinged.

The dasher B consists of a shaft, provided, at regular intervals between the arms or abutments $b\ b$ in the barrel, with blades $c\ c$, the lower of which are inclined in the direction which the dasher rotates, to form scrapers, and the others are arranged in line with each other, and are provided with a series of holes, which are made flaring in the direction of their rotation.

The dasher-shaft is provided on its upper end with a bevel-wheel, P, and at each end with a journal, the lower of which is supported by the plate $e$, and the upper in a bearing, $g$, secured to the standard E.

The standard E carries the driving-shaft G, with its bevel-wheel L, that gears with the wheel P, on the dasher B, and also carries the upper bearing $g$ of said dasher.

It is connected at both its extremities, by hinges H H, with the posts D, so as to be capable of swinging or tilting laterally from over the barrel, and is provided at one of its extremities, on the side opposite the hinge, with a catch, I, by which the standard is secured in a vertical position during the operation of the churn.

As the blades or abutments $b\ b$ are arranged on a spiral rib, they are transversely inclined, so that, when the milk strikes against them, a downward current thereof is produced on that side, which is followed by an upward current on the opposite side, and a circulatory current being produced by the dasher-blades, a perfect agitation of the milk is effected.

Owing to the standard E being hinged at both extremities instead of only one being hinged, as has formerly been the case in this class of churns, a stronger and more rigid support is afforded the operating parts of the churn.

What I claim as my invention, and desire to secure by Letters Patent, is—

The combination of a rotary dasher, having perforated blades, with a series of spirally-arranged fixed blades in the barrel of the churn, substantially as and for the purpose herein set forth.

WM. E. BUDD.

Witnesses:
FRED. HAYNES,
W. J. TUSKA.